J. J. STROBEL.
ANNUNCIATOR FOR RAILWAYS.
APPLICATION FILED DEC. 14, 1908.
944,390.
Patented Dec. 28, 1909.
2 SHEETS—SHEET 2.
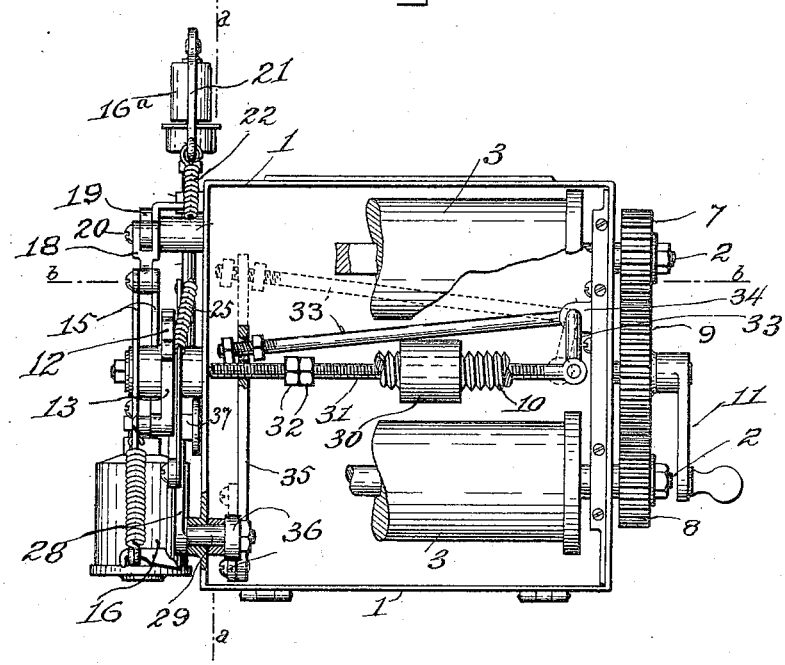
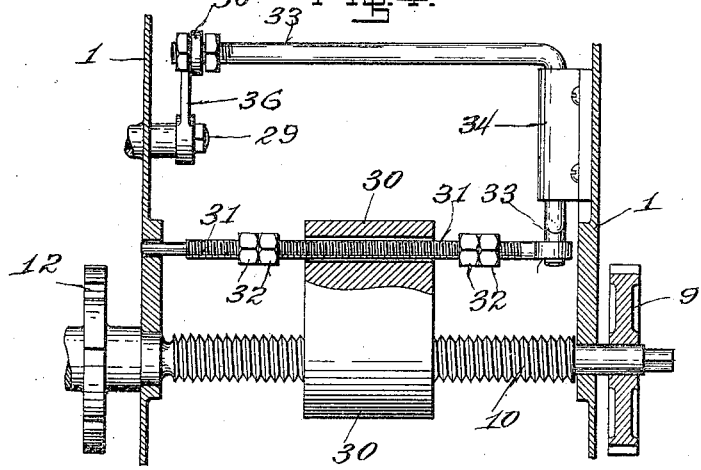
Witnesses:
Inventor
John Joseph Strobel

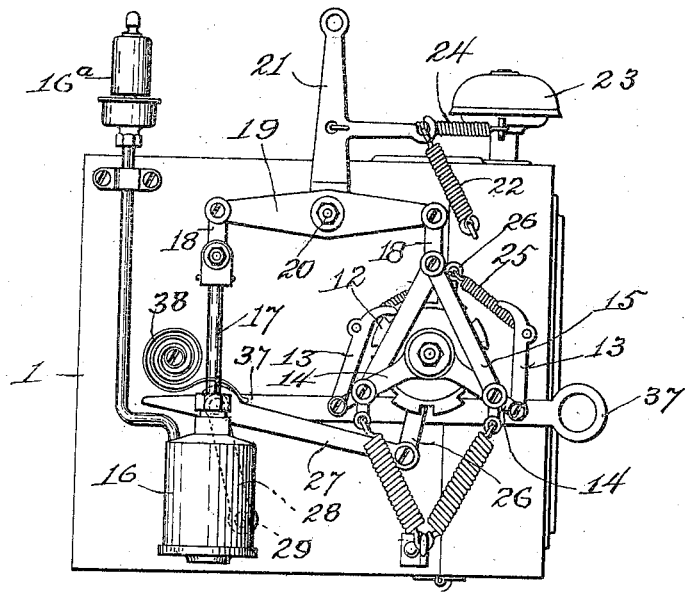

UNITED STATES PATENT OFFICE.

JOHN JOSEPH STROBEL, OF MERIDIAN, MISSISSIPPI, ASSIGNOR OF ONE-HALF TO EUGENE SPINNER, OF MERIDIAN, MISSISSIPPI.

ANNUNCIATOR FOR RAILWAYS.

944,390.  Specification of Letters Patent.  Patented Dec. 28, 1909.

Application filed December 14, 1908. Serial No. 467,561.

*To all whom it may concern:*

Be it known that I, JOHN JOSEPH STROBEL, a citizen of the United States of America, residing at Meridian, in the county of Lauderdale and State of Mississippi, have invented certain new and useful Improvements in Annunciators for Railways, of which the following is a specification, reference being had therein to the accompanying drawings.

This invention relates to the class of street and station indicators for railways, and pertains particularly to special means for operating a pair of sign sheet rollers by pneumatics, and to special means for automatically stopping and reversing the roller operating mechanism.

Certain of the devices herein claimed are shown and described in my application No. 412,951, filed January 27, 1908, but are not claimed therein.

In the accompanying drawings forming part of this application: Figure 1 is a side elevation. Fig. 2 is a sectional view on the line $a$—$a$, Fig. 3. Fig. 3 is an elevation with the rollers partly broken away and the view door removed. Fig. 4 is an enlarged detail section taken on the line $b$—$b$, Fig. 3, partly broken away.

The same reference numerals denote the same parts throughout the several views of the drawings.

A suitable box or casing 1, having spindles 2 of rollers 3 journaled therein, and provided with a hinged door 4 having a sight or view opening 5 in one end thereof. A sign sheet 6 is carried by the rollers 3, so as to be viewed through said opening 5. The spindles 2 are provided respectively with gear wheels 7 and 8, which mesh with a gear 9 on a screw shaft 10 journaled in the casing and extending therethrough. Said shaft 10, is adapted to be operated by a hand crank 11. The screw shaft 10 is provided with a ratchet-wheel 12 engaged by pawls 13 pivoted to arms 14, mounted adjacent the ratchet-wheel on the end of the shaft 10, said arms having levers 15.

The pawls and pawl-levers are operated by pneumatic pressure through a cylinder 16 adapted to be supplied with steam or compressed air for operating a suitable piston, the rod 17 of which and the levers 15 are connected by links 18 to a cross-head 19 fulcrumed at 20, said cylinder being provided with a signal-whistle 16ª. For the purpose of operating the cross-head by hand, a hand lever 21 projects from the cross-head and is controlled by a spiral-spring 22, and is connected to a signal-bell 23 by a spiral-spring 24. The pawls are controlled by spiral-springs 25 attached to a lever 26 fulcrumed on the ratchet end of the shaft 10, and the lever 26 is operated by a lever 27, connected to a link 28 having a trunnion 29.

The automatic stop and reversing means comprises a screw-block 30 mounted on and worked by the shaft 10, and a screw-rod 31 provided with lock-nuts 32, and extending through the block 30 so as to permit the latter to slide thereon between the lock-nuts during the turning of the shaft 10 in either direction, and a crank-shaft 33 journaled in a suitable bearing 34, and having one end attached to the screw-rod 31, and the other end attached to a lever 35, connected to the trunnion 29 by a link 36. In order to stop and reverse by hand, a hand lever 37 is connected with the lever 27, and the latter is engaged by a coil-spring 38.

It is obvious that the lock-nuts may be set to automatically limit the movement of the screw-block according to the desired movement of the sign-sheet, and that at the end of such desired sheet movement the block will automatically operate the mechanism for reversing the travel of the sheet.

In operation, the movement of the cross-head 19 operates the ratchet wheel 12 90 through the levers and pawls and turns the screw-shaft 10 which operates the rollers to successively bring to view street or station signs or names on the sign sheet, and during the rotation of the shaft 10, the screw-block 95 follows along the screw-rod 31 until the block strikes the lock-nuts, whereupon the said rod operates the crank-shaft which in turn operates the several levers between it and the shaft 10 to reverse the latter.

Having thus described my invention what I claim as new and desire to secure by Letters Patent is:

1. In an annunciator, the combination with revoluble rolls, and a suitable sign sheet carried by the rolls, of a screw-shaft geared to the rolls, a rod parallel with the shaft and having stops thereon, a screw-block slidable by the shaft on the rod between the stops, a pawl and ratchet device on one end of the shaft, a crank-shaft connected with the rod, and mechanism connecting the pawl and ratchet device with the crank-shaft.

2. In an annunciator, the combination, with the sign sheet rollers, a screw-shaft for operating the rollers, and means for revolving the shaft, of mechanism for reversing the movement of the rollers through the shaft comprising a screw-rod having lock-nuts, a block carried by the shaft and slidable on the rod between the nuts, a crank-shaft connected to and operated by the screw-rod when the block engages the nuts, a ratchet wheel on the shaft, pawls coöperating with the wheel, and a series of levers connecting the pawls with the said crank-shaft.

3. In an annunciator, the combination, with the sign sheet rollers, a screw-shaft for operating the rollers, and means for revolving the shaft, of a screw-rod parallel with the screw-shaft, a block slidable by the shaft on the rod, stops on the rod to limit the movement of the block, a pawl and ratchet device on the shaft, a series of levers connected to the pawls, a trunnion projecting from one end of said levers, a crank-shaft having one end attached to the screw-rod, a lever depending from the other end of the crank-shaft, and a link connecting the depending lever with the trunnion.

4. In an annunciator, the combination, with the sign sheet rollers, a screw-shaft for operating the rollers, and means for revolving the shaft, of a screw-rod parallel with the screw-shaft, a block slidable on the rod through the operation of the shaft, stops on the rod to limit the movement of the block, a crank-shaft connected with the rod and operated by the block engaging the stops, a pawl and ratchet device on the screw shaft, and means connecting the crank-shaft with the pawl and ratchet device for reversing the shaft and the rollers.

In testimony whereof I affix my signature in presence of two witnesses.

JOHN JOSEPH STROBEL.

Witnesses:
J. P. BLANEY,
EUGEN SPINNER.